United States Patent [19]

Stolz et al.

[11] Patent Number: 5,061,332

[45] Date of Patent: Oct. 29, 1991

[54] METHOD FOR REPLACING A WINDOW PANE IN A FLEXIBLE HOOD COVER AND REPLACEMENT PANE THEREFOR

[75] Inventors: Josef Stolz, Flieden; Rainer Gössann, Fulda, both of Fed. Rep. of Germany

[73] Assignee: Mehler Vario System GmbH, Fulda, Fed. Rep. of Germany

[21] Appl. No.: 443,261

[22] Filed: Nov. 29, 1989

[30] Foreign Application Priority Data

Jun. 12, 1988 [DE] Fed. Rep. of Germany ....... 3841036

[51] Int. Cl.⁵ .................... B60J 1/00; B32B 35/00
[52] U.S. Cl. .................... 156/94; 156/108; 296/85; 296/96.21
[58] Field of Search ............ 156/108, 292, 94; 219/203, 522; 296/84.1, 85, 96.21

[56] References Cited

U.S. PATENT DOCUMENTS 3,574,024 4/1971 Rose .................... 156/108
4,645,146 2/1987 Hall .................... 219/203 X Primary Examiner—Michael W. Ball
Assistant Examiner—Mark A. Osele
Attorney, Agent, or Firm—Hovey, Williams, Timmons & Collins

[57] ABSTRACT

For replacement of a rear window pan (2), which has become unusable, in the folding hood (1) of a convertible a replacement pane (6) is provided of which the encircling frame (7) is provided at its inner side with a hot-melt adhesive (9). Worked into the encircling frame (7) are electrical resistance heating wires (10) which can be subjected to current to soften the hot-melt adhesive (9) to enter an adhesive bond with a remaining edge region (5) of the old pane (2). Another pane replacement can be carried out simply in that the hot-melt adhesive (9) is again softened, the fitted replacement pane removed and replaced by a new one of the same type.

5 Claims, 1 Drawing Sheet

ME THOD FOR REPLACING A WINDOW PANE IN A FLEXIBLE HOOD COVER AND REPLACEMENT PANE THEREFOR

BACKGROUND OF THE INVENTION

1. Field of the Invention

The invention relates to a method for replacing a window pane in a flexible hood cover, in particular in the folding hood of a vehicle, and to a replacement pane for such a method.

2. Description of the Prior Art

Motor vehicles having a flexible folding top or hood, so-called convertibles or cabriolets, are provided for compact stowage of the folding hood generally also with a flexible rear window pane or sheet. Said near pane is highly stressed by the operation of the hood, and the flexible transparent material, which is not as robust as a glass disc, exposed to surface damage which permanently impair the transparency of the pane.

SUMMARY OF THE INVENTION

The replacement of the panes was hitherto very troublesome because they are generally physically sewn into the hood cover or fabric in order to obtain adequate sealing against rain. In order to avoid having to newly sew the replacement pane into the hood cover or fabric it has already been proposed to cut out the pane to be replaced only to such an extent that a peripheral edge thereof is preserved to which the replacement pane can then be adhered. This operation however can only be carried out once.

The invention is based on the problem of providing a method and a replacement pane suitable therefor with which it is possible to replace a rear pane which has been cut out and which was originally fixedly worked into the hook cover and to enable said replacement pane itself to be replaced again when it has become unusable.

This problem is solved according to the invention by a method according to the characterizing clause of claim 1. Expedient and preferred further developments of the invention are set forth in the subsidiary claims.

Although the invention is described specifically in relation to replacement of rear window panes in convertibles, it can also be applied to all flexible hoods, tops and roofs, for example in tents, as well as to tops of other vehicles, for example trucks and motor boats with fold-down tops.

The invention is based on the idea of inserting a replacement pane in that a releasable adhesive bond is established preferably to the remaining edge region of a cut-out pane. This procedure is preferred because it gives the least application and the easiest to seal installation. However, where the constructional conditions permit it is also possible after cutting out the entire pane to be replaced to stick the replacement pane to the peripheral edge of the hood encircling the window opening.

The releasable adhesion is achieved with a suitable hot-melt adhesive. To soften the adhesive, to establish the adhesive bond and to release it again, in the peripheral edge region of the replacement pane means are provided for heating said edge region and thus the hot-melt adhesive. Said means consist expediently of electrical heating resistance conductors which are worked for example into the peripheral edge of the replacement pane, for example can be cast therein or applied to the surface thereof. At the intended inner side of the pane terminals for the heating conductors are provided via which an external current source can be connected to the pane to activate the heating means.

In a preferred embodiment of the invention the replacement pane itself is not provided with the hot-melt adhesive but instead a specific encircling frame extending along the peripheral edge of the replacement pane. Said encircling frame preferably consists of a flexible expediently textile material and is configured so that on the one hand it overlaps the edge region of the actual replacement pane and also projects freely beyond the edge region of the replacement pane. The encircling frame may be sewn to the replacement pane or alternatively welded or adhered. For safety and sealing reasons two of these types of connections can be simultaneously employed. Preferably, the encircling frame is attached to the intended outer side of the replacement pane so that it overlaps the remaining peripheral region of the old pane and is adhered to the latter so that the new pane and the remainder of the old pane lie in the same plane. The encircling frame expediently extends over the entire remaining region of the old pane, covering the latter from the outside and simultaneously concealing the joint. The encircling frame is preferably made of a textile material, for example black, of low UV-radiation permeability so that the adhesive disposed beneath the encircling frame is not impaired by the action of sunlight over longer periods of time.

If desirable the encircling frame itself may consist of two parts which are separable from each other and can be connected together for example by means of a zip fastener. Such a zip fastener connection must be provided with corresponding sealing means.

The replacement of the pane according to the method of the invention is extremely simple. In the first replacement the old pane is expediently cut out in such a manner that an outer edge region remains. The replacement pane is then placed with its peripheral edge region on the remaining edge region and by corresponding current connection the heating means in the peripheral edge region of the replacement pane are activated, the hot-melt adhesive thereby being softened to enter an adhesive bond with the edge region of the old pane. The current flow is then interrupted and the adhesive can cool, thereby giving a permanently firm bond between the relevant areas. If the first replacement pane in turn becomes unusable the hot-melt adhesive need only be softened again by reapplying a current and in this state the pane which has become useless can be removed and replaced by a new pane of the same type.

Hereinafter the invention will be further explained with the aid of the attached drawings, wherein:

DETAILED DESCRIPTION OF THE DRAWINGS

Figure 1:
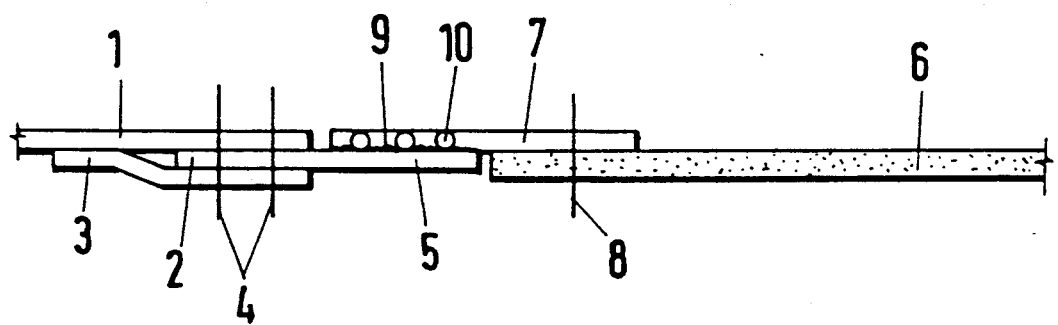
FIG. 1 is a schematic section through a bond according to a first variant of the method and FIG. 2 is a schematic section through a bond according to a second variant of the method.

In FIG. 1, 1 denotes the cover material of a flexible hood. The remainder 2 of the window pane to be replaced can be seen and is covered in its edge region on the inside by a cover 3. This laminate arrangement is preferably sewn by means of seams 4. The old pane 2 is cut out of the window opening in such a manner that an edge region 5 is left. A flexible replacement pane 6 is provided in its edge region with an encircling frame 7 which is sewn by means of a seam 8 to the pane 6. In addition, the textile encircling frame 7 may be welded by high-frequency welding to the replacement pane 6. In its projecting region the encircling frame 7 is provided at its lower side with a hot-melt adhesive 9. In the encircling frame 7 resistance heating wires 10 are further arranged and when they are subjected to current the hot-melt adhesive 9 can be brought into a softened state. In said state the new pane 6 is placed with its peripheral frame 7 onto the edge region 5 of the old pane and the adhesive then allowed to cool. This gives a permanent and sealing bonding between the edge 5 of the old pane and the new pane 6 or the encircling frame 7 thereof. As is apparent from FIG. 1 the encircling frame 7 covers the connection area completely so that the hood has a pleasant external appearance even with the replacement pane. The electrical terminals, not shown, for the resistance heating wires 10 are provided at the inner side of the pane so that they cannot be tampered with from the outside.

Figure 2:
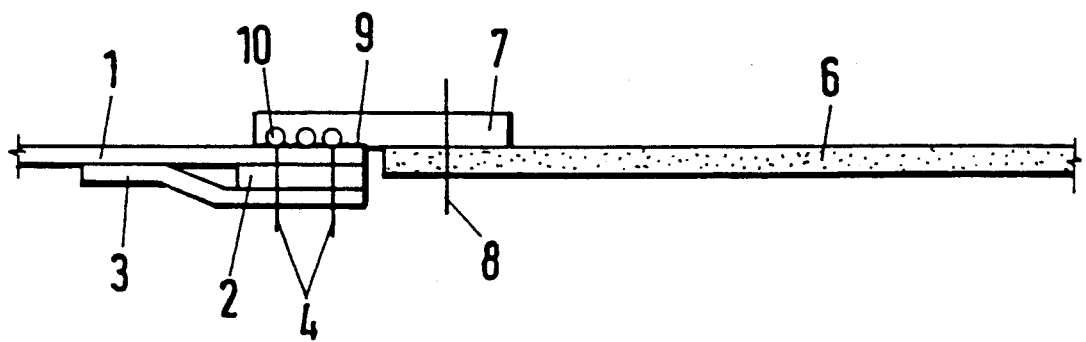

The embodiment of FIG. 2 differs from that of FIG. 1 only is that in this case no remainder of the old pane 2 has been left, The encircling frame 7 being instead adhered directly to the peripheral edge of the hood cover 1. The procedure is the same. As apparent from the illustrations in the drawings the embodiment of FIG. 1 is the more elegant involving less application. However, it has the disadvantage that the pane area of the replacement pane must be somewhat smaller than in the case of FIG. 2.

By resoftening the hot-melt adhesive 9 by activating the resistance heating wires 10 the adhesive bond can be released again when the replacement pane has become unusable and itself is to be replaced by a new one.

We claim:

1. A method for replacing a flexible window pane in a flexible hook cover of a vehicle comprising the steps of:
    cutting out at least a portion of the window pane to be replaced to define a window opening edge;
    preparing a replacement window pane member having one side and another side and area dimensions which are greater than the window opening edge, said replacement window pane member including a peripheral edge region, a hot-melt adhesive provided in said peripheral edge again, and means for heating said hot-melt adhesive located in said peripheral edge region;
    placing the replacement pane in covering relationship to the window opening edge;
    activating the heating means to heat said hot-melt adhesive;
    pressing the peripheral edge region of said replacement window pane member against the window opening edge with said hot-melt adhesive in contact therewith; and
    deactivating the heating means to allow said hot-melt adhesive to cool.

2. A method as set forth in claim 1, wherein said replacement window pane member includes a flexible transparent window pane and a surrounding frame.

3. A method as set forth in claim 1 wherein the window pane to be replaced is cut out in a manner leaving a peripheral strip of flexible window pane defining the window opening edge against which said hot-melt adhesive is pressed.

4. A method as set forth in claim 1 wherein the window panel to be replaced is cut out in a manner whereby the hook cover defines the window opening edge against which said hot-melt adhesive is pressed.

5. A method as set forth in claim 1, wherein the heating means includes an electrical resistance conductor, and wherein said activation step includes providing an electrical current to said electrical resistance heating conductor.

* * * * *